US010466138B2

(12) United States Patent
Poon et al.

(10) Patent No.: US 10,466,138 B2
(45) Date of Patent: Nov. 5, 2019

(54) DETERMINING REMAINING USEFUL LIFE OF ROTATING MACHINERY INCLUDING DRIVE TRAINS, GEARBOXES, AND GENERATORS

(76) Inventors: Andy Poon, Nottingham (GB); Xiaoqin Ma, Nottingham (GB); John Karl Coultate, Nottingham (GB); Evgenia Golysheva, Loughborough (GB)

(*) Notice: Subject to any disclaimer, the term of this patent is extended or adjusted under 35 U.S.C. 154(b) by 528 days.

(21) Appl. No.: 14/119,146

(22) PCT Filed: May 21, 2012

(86) PCT No.: PCT/GB2012/051153
§ 371 (c)(1),
(2), (4) Date: Nov. 20, 2013

(87) PCT Pub. No.: WO2012/160370
PCT Pub. Date: Nov. 29, 2012

(65) Prior Publication Data
US 2014/0088887 A1    Mar. 27, 2014

(30) Foreign Application Priority Data

May 20, 2011  (GB) .................................. 1108476.1
Jun. 14, 2011  (GB) .................................. 1110003.9
Jun. 20, 2011  (GB) .................................. 1110360.3

(51) Int. Cl.
*G01M 13/00*  (2019.01)
*F03D 17/00*  (2016.01)
(Continued)

(52) U.S. Cl.
CPC .............. *G01M 13/00* (2013.01); *F03B 15/00* (2013.01); *F03D 7/02* (2013.01); *F03D 17/00* (2016.05);
(Continued)

(58) Field of Classification Search
CPC .... G01M 13/00; G01M 13/02; G01M 13/021; G01M 13/028; G01M 13/04;
(Continued)

(56) References Cited

U.S. PATENT DOCUMENTS 4,807,598 A *  2/1989  Hasegawa .......... A61B 1/00071
                                              600/140
5,530,647 A *  6/1996  Sem ...................... F01M 11/10
                                              340/457.4
(Continued)

FOREIGN PATENT DOCUMENTS

CN      1553989 A    12/2004
CN    101196432 A     6/2008
(Continued)

OTHER PUBLICATIONS

Anonymous, Condition Monitoring—An Owner's Perspective, URL:http://www.renewable-uk.com/events/offshore-wind-conference/Proceedings/pdf/Nussey.pdf, Jul. 5, 2010.
(Continued)

*Primary Examiner* — Manuel L Barbee
(74) *Attorney, Agent, or Firm* — David D. Brush; Westman, Champlin & Koehler, P.A.

(57) ABSTRACT

A method for predicting remaining useful life of a wind or water turbine or component determines in step (116) an EOH for the turbine or component and compares this in step (118) to an EOH limit obtained in step (114). This provides a simple approach to estimating remaining useful life, giving the turbine operator an indication of the condition of turbines or farms under management.

15 Claims, 8 Drawing Sheets

(51) Int. Cl.
  *F03D 80/50* (2016.01)
  *G05B 23/00* (2006.01)
  *F03B 15/00* (2006.01)
  *G05B 23/02* (2006.01)
  *F03D 7/02* (2006.01)

(52) U.S. Cl.
  CPC ............. *F03D 80/50* (2016.05); *G05B 23/00* (2013.01); *G05B 23/0283* (2013.01); *F05B 2260/821* (2013.01); *F05B 2260/84* (2013.01); *F05B 2270/332* (2013.01); *Y02E 10/226* (2013.01); *Y02E 10/722* (2013.01); *Y02E 10/723* (2013.01)

(58) Field of Classification Search
  CPC ...... G01M 13/045; F03B 15/00; F03D 1/003; F03D 7/02; F03D 7/0292; F03D 11/0091; G05B 23/00; G05B 23/0283; G05B 23/0254; G05B 23/0235; G05B 23/02; F05B 2260/821; F05B 2260/84; F05B 2270/332
  See application file for complete search history.

(56) References Cited

U.S. PATENT DOCUMENTS

| | | | |
|---|---|---|---|
| 6,636,813 | B1 | 10/2003 | Isobe et al. |
| 6,671,647 | B2 | 12/2003 | Ishii et al. |
| 7,065,471 | B2 | 6/2006 | Gotoh et al. |
| 7,103,507 | B2 | 9/2006 | Gorinevsky et al. |
| 7,914,250 | B2 | 3/2011 | Behera et al. |
| 8,510,060 | B2 | 8/2013 | Hardwicke et al. |
| 8,761,912 | B1 | 6/2014 | Chapman, Jr. et al. |
| 2003/0100974 | A1 | 5/2003 | Alvarez et al. |
| 2004/0093931 | A1* | 5/2004 | Carlstrom .......... G01N 33/2876 73/53.05 |
| 2004/0148129 | A1* | 7/2004 | Gotoh ................ F02C 7/00 702/183 |
| 2008/0140349 | A1 | 6/2008 | Behera et al. |
| 2008/0228314 | A1 | 9/2008 | Sjostrand et al. |
| 2009/0118897 | A1 | 5/2009 | Schoeggl |
| 2009/0164166 | A1 | 6/2009 | Mayrhofer et al. |
| 2009/0171594 | A1 | 7/2009 | Norihisa |
| 2010/0206058 | A1 | 8/2010 | Kunze et al. |
| 2010/0298995 | A1 | 11/2010 | Zhang et al. |
| 2010/0332272 | A1* | 12/2010 | Ong ................... F03D 7/0292 705/7.36 |
| 2011/0106510 | A1 | 5/2011 | Poon |
| 2011/0307160 | A1 | 12/2011 | Verdegan et al. |
| 2012/0203704 | A1 | 8/2012 | Nakamura |
| 2014/0088887 | A1 | 3/2014 | Poon et al. |

FOREIGN PATENT DOCUMENTS

| | | |
|---|---|---|
| CN | 102016736 A | 4/2011 |
| EP | 1316866 A1 | 6/2003 |
| EP | 1930855 A2 | 6/2008 |
| EP | 1965281 A1 | 9/2008 |
| EP | 2056179 A2 | 5/2009 |
| EP | 2264314 A2 | 12/2010 |
| EP | 2273168 A2 | 1/2011 |
| EP | 2302207 A1 | 3/2011 |
| JP | H1185266 A | 3/1999 |
| JP | 2004101417 A | 4/2004 |
| JP | 2004301030 A | 10/2004 |
| JP | 2006342766 A | 12/2006 |
| JP | 2010159710 A | 7/2010 |
| JP | 2012140905 A | 7/2012 |
| WO | 02103177 A1 | 12/2002 |
| WO | 2009/091335 A1 | 7/2009 |
| WO | 2011035977 A1 | 3/2011 |
| WO | 2011/060424 A1 | 5/2011 |

OTHER PUBLICATIONS

International Search Report dated Sep. 14, 2012 for corresponding International Application No. PCT/GB2012/051153.
Written Opinion of the International Searching Authority dated Sep. 14, 2012 for corresponding International Application No. PCT/GB2012/051153.
English Translation of the Fourth Chinese Office Action dated Mar. 5, 2018 for CN Application No. 201280024323.3.
Search Report under Section 17, dated Sep. 17, 2012, for GB Application No. 1208958.7.
Combined Search and Examination Report under Sections 17 & 18(3), dated Sep. 18, 2012, for GB Application No. 1208958.7.
International Search Report dated Sep. 14, 2012, for International Application No. PCT/GB2012/051154.
Fourth Chinese Office Action dated Mar. 5, 2018 for CN Application No. 201280024323.3.
Examination Report Under Section 18(3) dated May 14, 2013, for GB Application No. 1208958.7.
Written Opinion of the International Searching Authority dated Nov. 20, 2013 for corresponding International Application No. PCT/GB2012/051154.
English translation of the Decision of Refusal from the Japanese Patent Office dated Mar. 6, 2018 for JP Application No. 2014-510891.
EP Office Action dated Dec. 18, 2015 for EP Application No. 12733515.6.
EP Office Action dated Dec. 18, 2015 for EP Application No. 12733516.4.
English translation of the Chinese Office Action dated Dec. 21, 2015 for CN Application No. 201280024307.4.
English translation of the Chinese Office Action dated Dec. 29, 2015 for CN Application No. 201280024323.3.
English translation of the Japanese Search Report dated Mar. 28, 106 for JP Application No. 2014-510891.
English translation of the Notification of Reasons for Refusal from the Japanese Patent Office dated May 10, 2016, for JP Application No. 2014-510891.
English translation of the Search Report dated May 20, 2016 for Corresponding Chinese Application No. 201280024307.4.
English translation of the Second Chinese Office Action dated May 30, 2016 for Chinese Application No. 201280024307.4.
English translation of the Third Chinese Office Action dated Jan. 13, 2017 for Chinese Application No. 201280024307.4.
English translation of the Second Chinese Office Action dated Jan. 24, 2017 for Chinese Application No. 201280024323.3.
English translation of the Notification of Refusal from the Japanese Patent Office dated Mar. 7, 2017 for Japanese Application No. 2014-510891.
English translation of the Third Chinese Office Action dated Aug. 21, 2017 for Chinese Application No. 201280024323.3.
European Office Action dated Nov. 23, 2017 for EP Application No. 12733516.4.
European Office Action dated Nov. 23, 2017 for EP Application No. 112733515.6.
English translation of the Supplemental Chinese Search Report dated Feb. 23, 2018 for CN Application No. 201280024323.3.
English translation of the Fourth Chinese Office Action dated Dec. 29, 2018 for corresponding Chinese Application No. 2012800243074.
English translation of the Examination Report dated Nov. 30, 2018 for corresponding Indian Application No. 2382/MUMNP/2013.
English translation of the Examination Report dated Feb. 27, 2019 for corresponding Indian Application No. 2383/MUMNP/2013.
Notification of Reasons for Refusal dated Oct. 22, 2018 for corresponding Korean Application No. 10-2013-030809.
Notice of Allowance dated Sep. 9, 2019 from the USPTO for corresponding U.S. Appl. No. 15/676,147, filed Aug. 14, 2017.
Machine English Translation of Notice of Reasons for Refusal from Japanese Patent Office dated Jun. 26, 2019 for corresponding JP Application No. 2018-088755.

(56) References Cited

OTHER PUBLICATIONS

Machine English Translation of Notice of Final Rejection from the Korean Patent Office dated Sep. 2, 2019 for corresponding Korean Application No. 10-2013-7030809.

* cited by examiner

DETERMINING REMAINING USEFUL LIFE OF ROTATING MACHINERY INCLUDING DRIVE TRAINS, GEARBOXES, AND GENERATORS

TECHNICAL FIELD

The present invention relates to methods for determining residual useful life of rotating machinery including drive trains, gearboxes, and generators. The approaches relate to determination of an Equivalent Operating Hours limit for the machinery and comparing it with an Equivalent Operating Hours value for the machinery. In particular it relates to methods for determining residual useful life of wind and water turbines and components thereof, and using these data to operate and manage turbine installations.

BACKGROUND ART

Although the design life of a wind turbine gearbox is typically more than twenty years, failures of wind turbine gearboxes within four to five years are not uncommon. This is because residual useful life (RUL) calculation procedures are based on assumed operating profiles, whereas in operation, the actual profile could be very different.

Monitoring operating parameters related to the operation of a wind or water turbine or component thereof, and determining when these parameters move outside an operating window, may indicate that some kind of maintenance or investigation is needed. Operating parameters that are monitored could include lubrication temperature, lubrication debris, vibration, and power output.

Vibration is commonly measured by Condition Monitoring Systems. Generally speaking, large vibrations compared to a norm is indicative of damage.

Vibration analysis generally relies on a measurement provided by a sensor exceeding a predetermined threshold, which is prone to false alarms if the threshold is set too low. The threshold level is not necessarily constant and may vary with frequency (and hence speed). The presence of shocks and extraneous vibrations means that the threshold level must be set sufficiently high to minimise the risk of false-alarms. Furthermore, the threshold must be sufficiently high to avoid any negative effects caused by 'creep' in sensor performance which may occur over its lifetime. In addition, there is no discrimination between vibrations associated with failure or damage and those which are not indicative of failure or damage.

Faults developing during operation, such as an imbalance in a rotor, can create loads on a bearing in excess of that expected resulting in a reduction in its design life. Incipient faults, such as unbalance, can be detected from analysis of vibration signatures. This gives the magnitude of an imbalance, and an excitation force due to imbalance is a function of the magnitude of the imbalance and square of the speed. An excitation force due to faults can thus be calculated from field operational conditions and used to calculate individual component loads. Deviation from the assumed operating profile can be addressed by using a generic wind simulation model to determine load at the turbine shaft, which allows individual component loads based on the field operational conditions to be calculated. Combining these gives the total load at each component, which can be is used to estimate the remaining life of the individual components and the life of the gearbox.

However, shortcomings in wind simulation models mean that the load at the turbine shaft may not be reliably or accurately determined.

Equivalent Operating Hours (EOH), in simple terms, defines damage as being equivalent to the damage caused to a wind or water turbine or components thereof by one hour of operation under rated operating conditions. The EOH is equal to a weighting factor related to the operational condition multiplied by a duration (or alternatively, frequency) of that condition. For any operation in which damage caused is the same as that expected to be caused under rated conditions, the EOH of a component after 1 h will be 1 h, and the weighting factor will be 1.0. If an operational event causes greater damage, then the EOH will be reduced accordingly. Thus, an operational event of duration of 0.2 h of duration and having a weighting factor of 0.7, then the EOH after 1 h will be $0.8 \times 1 + 0.2 \times 0.7 = 0.94$.

DISCLOSURE OF THE INVENTION

According to a first aspect, the present invention provides a method for predicting remaining useful life of a wind or water turbine or component thereof, the method comprising the steps of: obtaining an EOH limit value for the wind or water turbine or component thereof; determining an EOH for the wind or water turbine or component thereof; and comparing the EOH and the EOH limit.

Preferably, the step of determining an EOH comprises the steps of: providing data relating to one or more operating conditions; and providing one or more EOH coefficients relating to the one or more operating conditions.

Preferably, the step of providing one or more EOH coefficients, comprises the steps of: assessing damage to the wind or water turbine or a component thereof under rated operating conditions and under a plurality of field operating conditions; calculating the weighting factor from the damage under rated conditions and the damage caused under the plurality of field operating conditions; wherein the step of assessing damage comprises the step of providing information on the wind or water turbine or a component thereof.

Preferably, the step of providing information includes providing one or more models selected from the group consisting of: a bearing skidding model; a dynamic model; a life model; a nominal model of the gearbox, drive-train and/or generator; a model unique to the specific gearbox, drive-train and/or generator including information on one or more manufacturing variations of one or more components of the gearbox, drive-train and/or generator; a fully coupled finite element model comprising nodes with six degrees of freedom unique to the gearbox, drive-train and/or generator; and one or more meta-models, wherein the one or more meta-models are specific for each of the one or more components.

Preferably, the weighting factor is a function of the damage under rated operating conditions and damage under field operating conditions. Preferably, the weighting factor is a function of a ratio of damage under rated operating conditions to damage under field operating conditions. Preferably, the weighting factor is a ratio of damage under rated operating conditions to damage under field operating conditions.

Preferably, the step of determining an EOH comprises calculating a value of a function of the data relating to the one or more operating conditions and the one or more EOH coefficients relating to the one or more operating conditions. Preferably, the step of determining an EOH comprises calculating a sum of a product of the data relating to the one or more operating conditions and the one or more EOH coefficients relating to the one or more operating conditions.

Preferably, the step of providing data comprises providing historical data. Preferably, the step of providing data comprises providing data relating to one or more steady state operating conditions. Preferably, the step of providing data comprises providing data relating to one or more transient state operating conditions. Preferably, the step of providing data comprises collecting data from one or more sensors monitoring the one or more operating conditions. Preferably, the step of providing data comprises providing data from a condition monitoring system.

Preferably, the step of providing one or more EOH coefficients comprises providing EOH coefficients relating to one or more steady state operating conditions. Preferably, the step of providing one or more EOH coefficients comprises providing EOH coefficients relating to one or more transient state operating conditions.

Preferably, the EOH being greater than the EOH limit, additionally comprising the step of: maintaining the wind or water turbine or component thereof.

Preferably, the wind or water turbine or a component thereof has failed, and in which the EOH being less than the EOH limit, additionally comprising the step of: maintaining the wind or water turbine or component thereof.

Preferably, the step of maintaining the wind or water turbine or component thereof comprises investigating for damage to the wind or water turbine or component thereof.

Preferably, the step of investigating for damage is selected from the group consisting of: using an endoscope, performing vibration analysis and performing lubrication analysis.

Preferably, the wind or water turbine or component thereof having damage, scheduling maintenance of the wind or water turbine or component thereof.

Preferably, the wind or water turbine or component thereof having damage, refurbishing the wind or water turbine or component thereof.

Preferably, the wind or water turbine or component thereof having irreparable damage, replacing the wind or water turbine or component thereof.

Preferably, the method comprises the additional step of: setting EOH of the wind or water turbine or component to zero.

Additionally disclosed is a method for identifying a wind turbine or component thereof for maintenance, the method comprising the steps of: determining an EOH value for the wind turbine or component thereof; analysing operating data for the wind turbine or component thereof; and comparing the operating data with a threshold related to the EOH value.

Preferably, the step of determining an EOH comprises the steps of: providing data relating to one or more operating conditions; and providing one or more EOH coefficients relating to the one or more operating conditions.

Preferably, the step of providing one or more EOH coefficients, comprises the steps of: assessing damage to the wind or water turbine or a component thereof under rated operating conditions and under a plurality of field operating conditions; calculating the weighting factor from the damage under rated conditions and the damage caused under the plurality of field operating conditions; wherein the step of assessing damage comprises the step of providing information on the wind or water turbine or a component thereof.

Preferably, the step of providing information includes providing one or more models selected from the group consisting of: a bearing skidding model; a dynamic model; a life model; a nominal model of the gearbox, drive-train and/or generator; a model unique to the specific gearbox, drive-train and/or generator including information on one or more manufacturing variations of one or more components of the gearbox, drive-train and/or generator; a fully coupled finite element model comprising nodes with six degrees of freedom unique to the gearbox, drive-train and/or generator; and one or more meta-models, wherein the one or more meta-models are specific for each of the one or more components.

Preferably, the weighting factor is a function of the damage under rated operating conditions and damage under field operating conditions. Preferably, the weighting factor is a function of a ratio of damage under rated operating conditions to damage under field operating conditions. Preferably, the weighting factor is a ratio of damage under rated operating conditions to damage under field operating conditions.

Preferably, the step of determining an EOH comprises calculating a value of a function of the data relating to the one or more operating conditions and the one or more EOH coefficients relating to the one or more operating conditions.

Preferably, the step of determining an EOH comprises calculating a sum of a product of the data relating to the one or more operating conditions and the one or more EOH coefficients relating to the one or more operating conditions.

Preferably, the method additionally comprises the step of setting thresholds for operating data according to one or more ranges of EOH values.

Preferably, the operating data is vibration data.

Preferably, identifying a wind turbine or component thereof for maintenance comprises identifying a wind turbine or component thereof in which the operating data is greater than the threshold.

Also disclosed is a method for calculating a EOH weighting factor for a wind or water turbine or a component thereof, the method comprising the steps of: assessing damage to the wind or water turbine or a component thereof under rated operating conditions and under a plurality of field operating conditions; calculating the weighting factor from the damage under rated conditions and the damage caused under the plurality of field operating conditions; wherein the step of assessing damage comprises the step of providing information on the wind or water turbine or a component thereof.

Preferably, the step of providing information includes providing one or more models selected from the group consisting of: a nominal model of the gearbox, drive-train and/or generator; a model unique to the specific gearbox, drive-train and/or generator including information on one or more manufacturing variations of one or more components of the gearbox, drive-train and/or generator; a bearing skidding model; a dynamic model; a life model; a fully coupled finite element model comprising nodes with six degrees of freedom unique to the gearbox, drive-train and/or generator; and one or more meta-models, wherein the one or more meta-models are specific for each of the one or more components.

Preferably, the weighting factor is a function of the damage under rated operating conditions and damage under field operating conditions. Preferably, the weighting factor is a function of a ratio of damage under rated operating conditions to damage under field operating conditions. Preferably, the weighting factor is a ratio of damage under rated operating conditions to damage under field operating conditions.

Also disclosed is a computer readable product comprising code means designed for implementing the steps of the method according to any of the methods disclosed above.

Also disclosed is a computer system comprising means designed for implementing the steps of the method according to any of the methods disclosed above.

BRIEF DESCRIPTION OF DRAWINGS

The present invention will now be described, by way of example only, with reference to the accompanying drawing, in which.

BEST MODE FOR CARRYING OUT THE INVENTION

Figure 1:
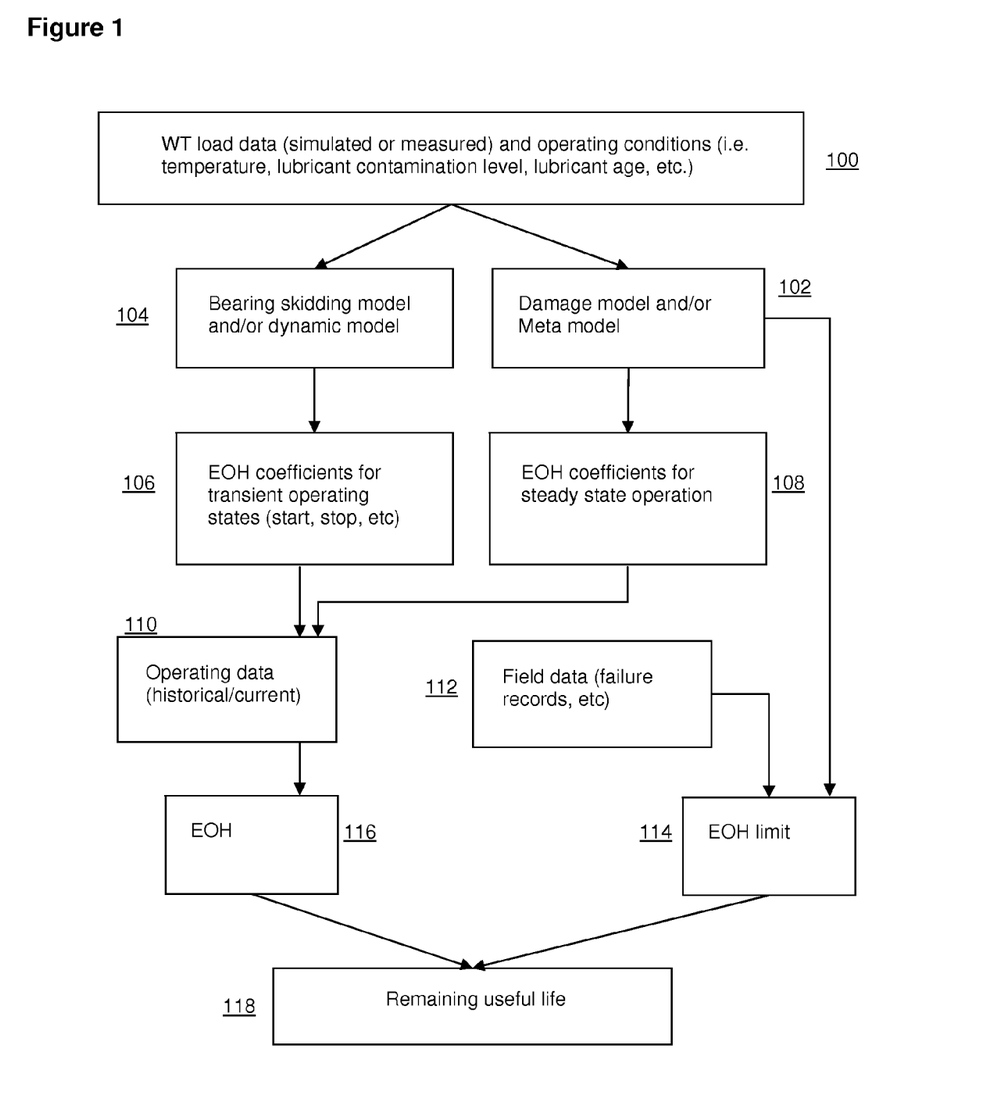
FIG. 1 shows a flow chart for predicting remaining useful life of a wind or water turbine or components thereof.

Methods for determining damage to a rotating machine, such as a gearbox, drive train, generator, wind turbine or a water turbine, or individual components of these rotating machines, is illustrated in FIG. 1.

In a first step 100 turbine load data (which may be simulated or measured) is collected and operating conditions, such as temperature of various bearings, oil conditions, and the like are sensed and logged. Operating condition data can be chosen to represent a typical range of conditions, or they can be obtained from historical logged data such as SCADA or a condition monitoring system.

This data can be used in step 102 in a damage-determining model or meta model to determine EOH coefficients 108 relating to steady-state operating conditions.

Corresponding EOH coefficients 106 for non-steady state (transient) conditions can be determined in step 104 using a dynamic model of wind turbine and components, and/or a bearing skidding model, model of the lubrication system or the like.

In step 116, current or historical operating data 110 are provided and EOH is derived from this data and the EOH coefficients determined in steps 106 and 108 according to the relationship:

EOH=$f$(operating condition,EOH coefficient)

In steps 112 and 114, EOH limit is determined from field data (failure records and the like). EOH limit is simply the expected life of the wind or water turbine or component thereof.

In step 118, a comparison of EOH limit and EOH yields a value for the remaining useful life (RUL) of the component.

In the present invention, EOH weighting factors or coefficients are obtained from assessing damage to the wind or water turbine or a component thereof under field operating conditions and damage to the wind or water turbine or a component thereof under rated operating conditions of the same duration.

The wind or water turbine or a component thereof includes any component of the wind or water turbine and includes, for example, the turbine, turbine shaft, gearbox drive train, and generator, as well as any subcomponent, such as a gear, a drive shaft, and the like.

The EOH weighting factor or coefficient is a function of the damage under rated operating conditions and damage under field operating conditions of the same duration. It can be a function of a ratio of damage under rated operating conditions to damage under field operating conditions of the same duration.

Figure 2:
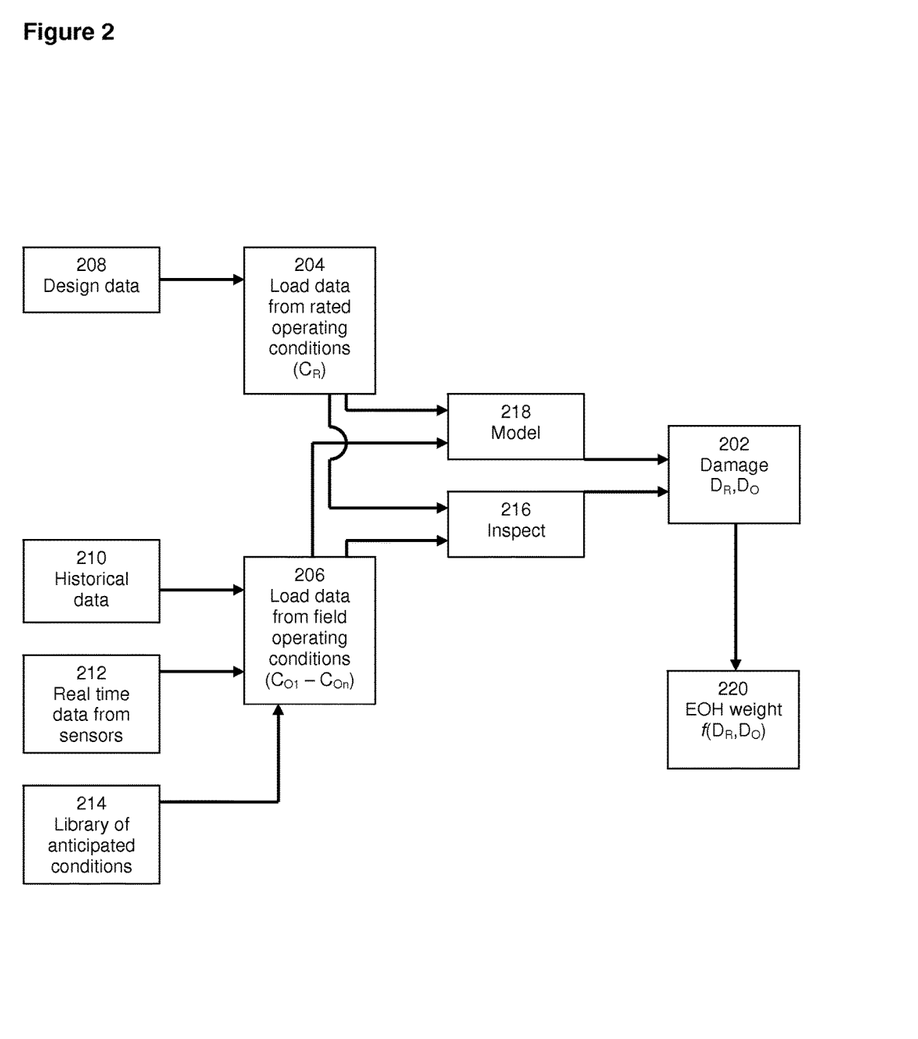
FIG. 2 shows a flow chart for the determination of damage to a wind or water turbine or component thereof.

FIG. 2 shows a flow chart for the determination of damage 202 to a wind or water turbine or component thereof.

Load data 204,206, for example forces and/or moments, acting on the wind or water turbine or component thereof is provided.

Load data 204 relates to operation under rated operating conditions ($C_R$), which can be the conditions for which the wind or water turbine or a component thereof was designed. Load data 204 can be obtained or derived from design data 208.

Load data 206 relates to loading under field operating conditions ($C_O$).

Field operating conditions can be historical sensor data 210 or SCADA data obtained from or derived from a CMS.

Field operating conditions can be real time sensor data 212 from actual operating conditions under which the wind or water turbine or a component thereof is being operated. This means that EOH weighting factors or coefficients can be calculated in real time. These EOH weighting factors or coefficients can be stored and used again when similar field operating conditions are experienced, leading to a reduction in computing capability required over time.

Field operating conditions can be a library of anticipated conditions 214 which is a range of operating conditions under which the wind or water turbine or a component thereof may be expected to operate. Alternatively or additionally, a library of anticipated conditions 214 can be populated by historical sensor data 210 or real time sensor data 212. This means that EOH weighting factors or coefficients can be calculated in advance of operation, reducing the amount of computing capability required during operation.

Design data 208, historical data 210, real time data 212 and library data 214 can comprise continuous ranges of data, or the data can be stratified into bins to simplify calculations.

The operating conditions can be steady state operating conditions or transient operating conditions.

Damage 202 under rated and field operating conditions is determined from information relating to the wind or water turbine or a component thereof. The information can be provided by inspection 216, or by using a model 218 of the wind or water turbine or component thereof.

The EOH weighting factor or damage coefficient 220 is a function of the damage under rated operating conditions and damage under field operating conditions of the same duration. It can be a function of a ratio of damage under rated operating conditions to damage under field operating conditions of the same duration. It can be a ratio of damage under rated operating conditions to damage under field operating conditions of the same duration.

Where design data 208, historical data 210, real time data 212 or library data 214 does not contain measured or specified load information, data 204, 206 can be derived from other specified or measured parameters present in the data. The derivation can be a simple manipulation of the data available, or it can be obtained using model 218 of the wind or water turbine or component thereof (not shown).

Various models may be used. For example, a unique model may be generated for one or more of each of the components of the wind or water turbine that leaves a production line. Each unique model is generated using the dimensions and clearances inferred from an end of line test and may remain related to the corresponding component throughout its operational life. The unique model can be used to calculate the loads, for example forces and/or moments, that may act on a component at any location or particular locations in or on the component according to the operating conditions. This in turn permits the calculation of the damage sustained by each component under rated or field operating conditions.

Figure 3:
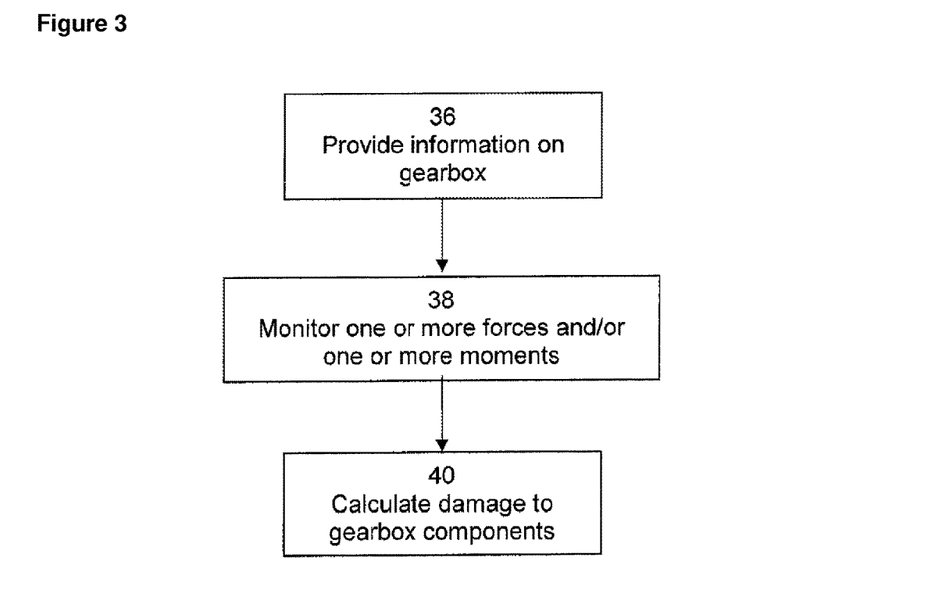
FIG. 3 shows the steps in a method for calculating damage to a wind or water turbine or a component thereof using a model-based approach.

FIG. 3 shows the steps in a method for calculating damage to a wind or water turbine or a component thereof using a model-based approach. The component may be, for example a gearbox, as indicated.

In a first step 36, information on a gearbox is provided. This may include a fully coupled model with six degrees of freedom. The model may also be unique to the gearbox. The information may include information relating to one or more manufacturing variations in the dimensions and clearances of components of a gearbox.

In a second step 38, loads, for example forces and/or moments, acting on the gearbox during field operating conditions can be monitored during operation or provided from historical data (eg SCADA). Alternatively the loads can be calculated from anticipated field operating conditions. Similarly the loads can be calculated from rated operating conditions. Where loads acting on the gearbox are continuously monitored during operation, these measurements may be taken at a regular sampling frequency of e.g. 50 Hz. In various embodiments of the invention, step 38 may include monitoring one or more loads over time. Monitoring one or more loads may include monitoring outputs of one or more condition monitoring sensors placed in or on the gearbox at predetermined locations.

In third step 40, the damage caused to each component by the one or more loads, in each sample of data, however determined is calculated. To do this, the fully coupled system model described above is used to calculate the system deflections and component loads. The contact between gear teeth is modelled using finite elements taking into account the tooth bending stiffness and gear mesh contact stiffness. These stiffnesses can be calculated or based on empirical data and are taken into account in the static deflection analysis of the full model. The tooth face load distribution, tooth contact stress or bending stress may be calculated for each gear mesh. These values may then be compared with empirical data or empirical methods used to calculate the operating contact stress, e.g. according to methods given in ISO 6336-2. The tooth bending stress may be calculated using finite element models or may be calculated using empirical methods, e.g. methods in ISO 6336-3. S-N curves for gear contact failure and gear bending failure may be employed and may be based on mathematical simulations or may be based on empirical data, e.g. data provided in ISO 6336. A prediction of the cumulative damage on each component is continuously updated, thus allowing the remaining life of each component to be predicted using empirical data e.g. S-N curves and bearing life data available from ISO standards.

The calculation of bearing damage can be performed using the RomaxDesigner software. This calculation takes into account factors such as bearing internal geometry, stiffness and deformation of bearing components, contact between bearing components and considers the bearing loads and stiffness.

It is possible that the provided gearbox information cannot be analysed at as high a frequency as the data is sampled. For example, the model analysis required to predict the damage due to each sample of data may take 1 second, but the data may be sampled at 50 Hz. In this case an approximation (a meta-model) can be employed so that the damages are predicted more quickly.

The meta-model is constructed in three stages:

1) a number of data samples are obtained from a gearbox model prior to the start of gearbox operation;
2) an underlying trend is determined using response surface methodology (RSM);
3) Gaussian deviations from this trend are introduced using a Gaussian kernel centred on each sample point.

The meta-model may be constructed using only steps 1) and 2) above.

Figure 4:
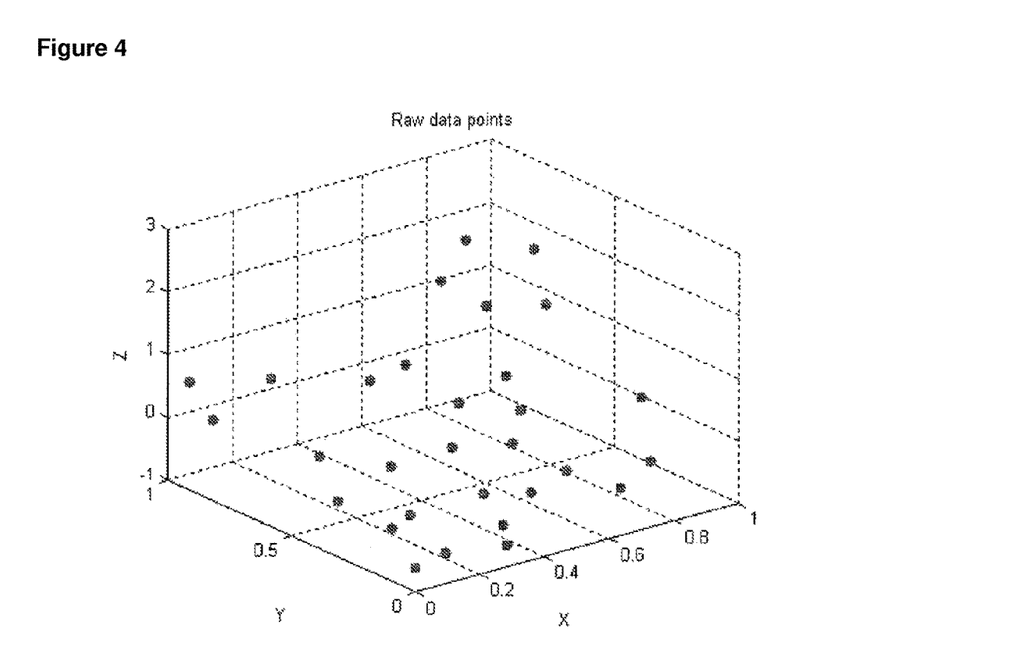
FIGS. 4, 5 and 6 show stages in the construction of a meta model.
Figure 5:
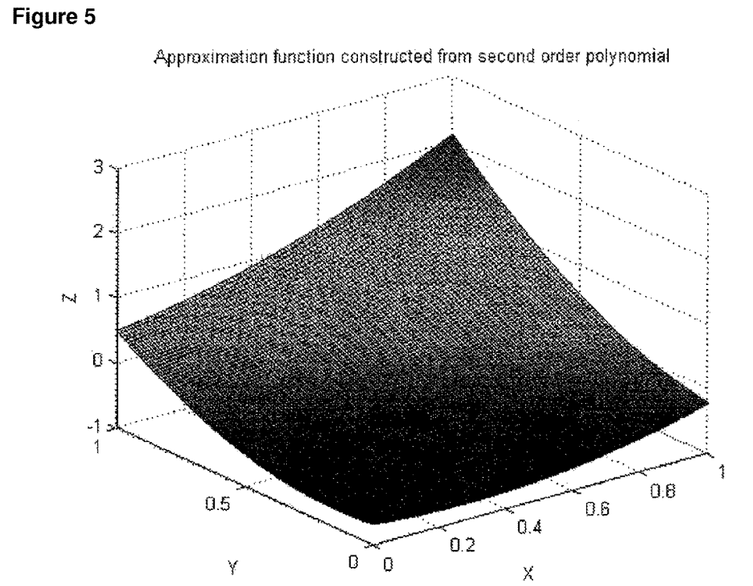
Figure 6:
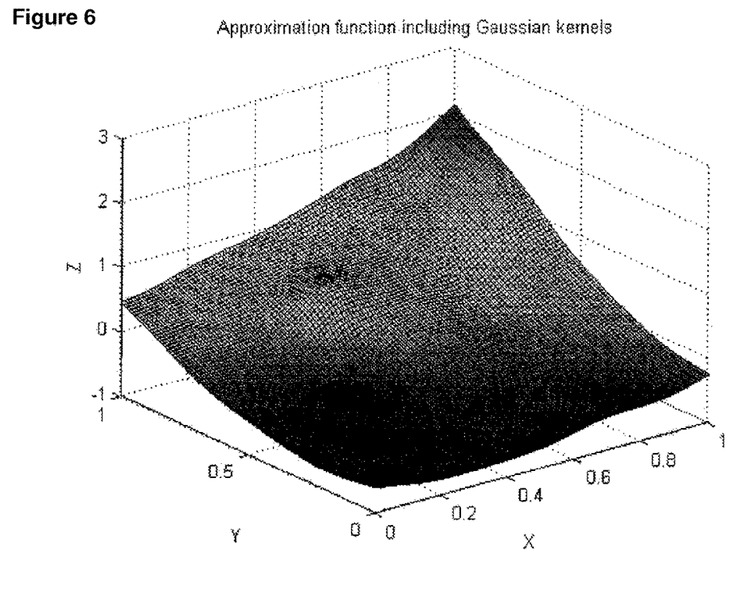

FIGS. 4 to 6 show the three stages listed above applied to a two-variable problem. FIG. 4 shows the plotted raw data points. FIG. 5 shows the approximation function constructed from a second order polynomial. FIG. 6 shows the approximation function including Gaussian kernels.

The variables in the meta-model can be one or more of the following loads which may be defined anywhere in the gearbox model, drivetrain or generator: force in the x-direction ($F_x$); force in the y-direction ($F_y$); force in the z-direction ($F_z$);

moment about the x-axis ($M_x$); moment about the y-axis ($M_y$), moment about the z-axis ($M_z$). Alternatively, the variables may include displacements in any of the x, y and z directions or rotations about any of the x, y, and z axes or temperature.

The meta-model is constructed from data samples each of which corresponds to a different combination of any of the variables listed above. The accuracy of the meta model can depend on the method used to determine the variables used to generate each data sample. A sampling regime in which the sample points are randomly determined is possible but is not ideal because it can result in some data samples having similar variables which may result in the meta-model being inaccurate. Spacing the data samples uniformly in the design space represented by the meta-model variables is preferred.

Uniform sampling of data in the meta-model variables design space is achieved by optimising the sampling strategy using a genetic algorithm. One method is to maximise the minimum distance between any two neighbouring sample points. Many other suitable sampling strategies exist in literature including minimising the maximum distance between any two neighbouring sample points; L2 optimality; latin hypercube sampling.

The process of identifying the underlying trend using Response Surface Methodology (RSM) consists of fitting a polynomial to the sample data using linear regression. The polynomial can be of any order and may include some or all of the possible terms. The number of variables in the polynomial is equal to the number of variables in the meta-model. A transformation can be applied to the sampled data before fitting the polynomial in order to decrease the 'model bias' which can arise due to the assumption that the data follows a polynomial trend. For example, if the behaviour of the response is observed to follow a trend similar to an exponential, then a polynomial can be fitted to the natural log of the variables in order to improve the meta-model accuracy.

The Gaussian deviations (step 3 above) may be represented by Gaussian functions with a number of dimensions equal to the number of variables in the meta-model. The deviations are not required to be Gaussian functions and may be represented by another mathematical function. The amplitude of each deviation may be equal to or related to the difference between the output of the polynomial model and the response level of the data sample.

A unique meta-model is constructed for each component in the gearbox (i.e. for each gear and bearing) to relate the measured variables with the resulting tooth face load distribution factor, $KH_\beta$, (for gears, as defined in ISO 6336) and load zone factor (for bearings, as defined in ISO 281). Any number of loads, for example forces and/or moments, acting at any point on the gearbox, drive train or generator may be related to these factors by the meta-models. The load zone factors and $KH_\beta$ values may then be used to calculate a corresponding amount of damage caused to each component. The meta-models may alternatively relate the measured variables with component stresses, component lives or percentage damages.

Figure 7:
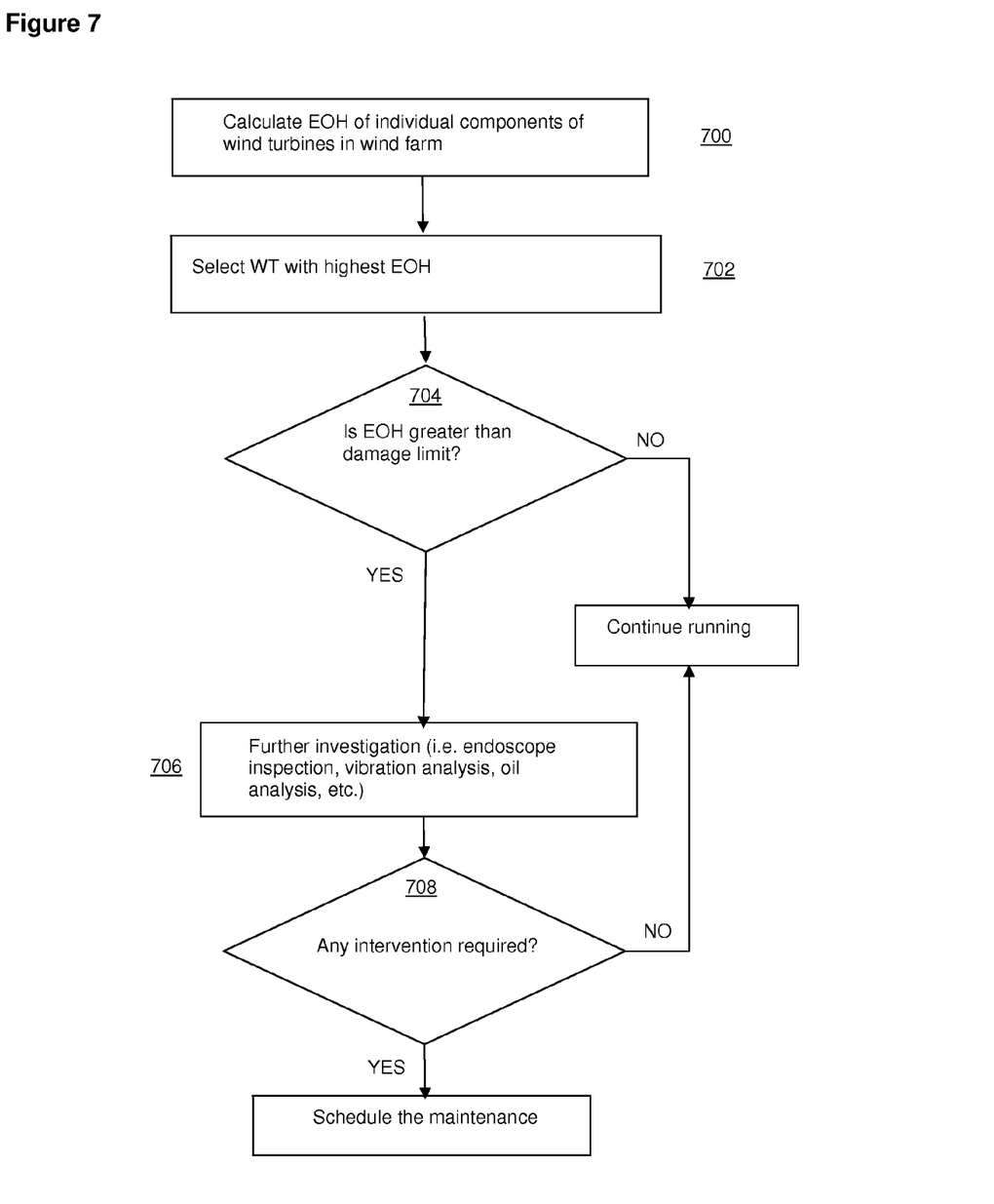
FIG. 7 shows a flow chart for scheduling maintenance of a wind or water turbine or components thereof based on an EOH analysis.

FIG. 7 shows a method for scheduling maintenance of wind or water turbine or components thereof based on an EOH analysis.

In step 700, the current EOH of the turbines in the turbine farm is determined, for example as disclosed above in relation to FIG. 1.

In step 702, a turbine or turbines having the highest EOH on one or more components is identified.

In step 704, the EOH value or values from step 702 are compared with a preset EOH limit for further forensic investigation. If the EOH value is less than this value, then no action is taken and the turbine continues operation.

If the EOH value is higher than this value, then in step 706 further investigations of the turbine are undertaken, for example endoscope inspection, vibration analysis, oil analysis and the like.

In step 708, the results of the investigation are assessed: if the investigation indicates that the turbine does not have an operational problem, then no action is taken and the turbine continues operation.

If the investigation indicates that the turbine does have an operational problem, then maintenance is scheduled and the turbine may be concomitantly down-rated.

Figure 8:
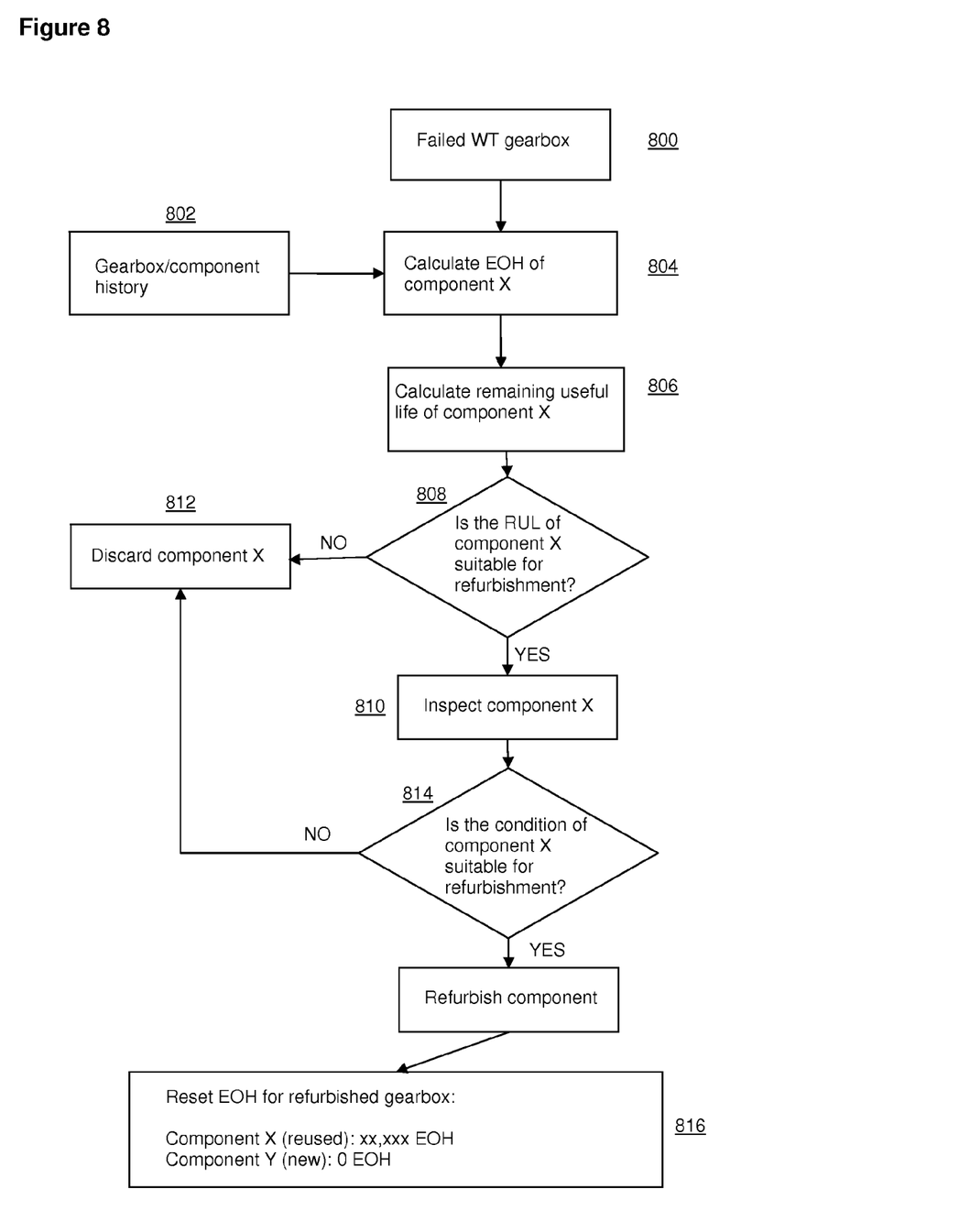
FIG. 8 shows a flow chart for gearbox refurbishment based on EOH analysis.

FIG. 8 shows a method for gearbox refurbishment based on EOH analysis.

In step 800, a failed turbine gearbox is provided, and in step 802 a corresponding gearbox and/or gearbox component history is provided.

In steps 804 and 806, an EOH of a component and a corresponding RUL of the component are respectively determined as disclosed above in relation to FIG. 1.

In step 808, an evaluation is made as to whether or not the RUL for the component indicates that refurbishment of the component may be worthwhile. If it is not, then the component is discarded.

If it is, then in step 810, the component is inspected.

In step 814, if the inspection indicates that refurbishment of the component is not worthwhile, the component is discarded.

In step 814, if the inspection indicates that component is suitable for refurbishment, the component is retained to provide a refurbished gearbox.

In step 816, if the component has been replaced, the EOH for the new component is set to zero.

According to a further aspect of the invention a method for operating a wind or water turbine or component thereof is based on a quantitative measure of vibration in relation to EOH for a wind or water turbine or component thereof.

The method may be illustrated by a simple example, in which operating parameter levels are stratified into three levels: low, medium and high.

As mentioned above, the danger or damage from increased vibration is dependent to a certain extent to the age of the wind or water turbine or component thereof, in other words, to EOH. EOH can be similarly stratified into three zones, low, medium and high.

This simple approach enables the wind or water turbine operator to prioritise maintenance activities based on EOH and CMS data, as for example in Table 1.

TABLE 1

Action needed according to a value for EOH and a level of an operating parameter

| | EOH | | |
|---|---|---|---|
| Operating parameter | Low | Medium | High |
| High | | | Turbine inspection recommended |
| Medium | | Investigation needed | |
| Low | | | |

The same approach may be adopted for other CMS data which may be used to monitor wind turbines by identifying wind turbines which exceed a threshold value.

Figure 9:
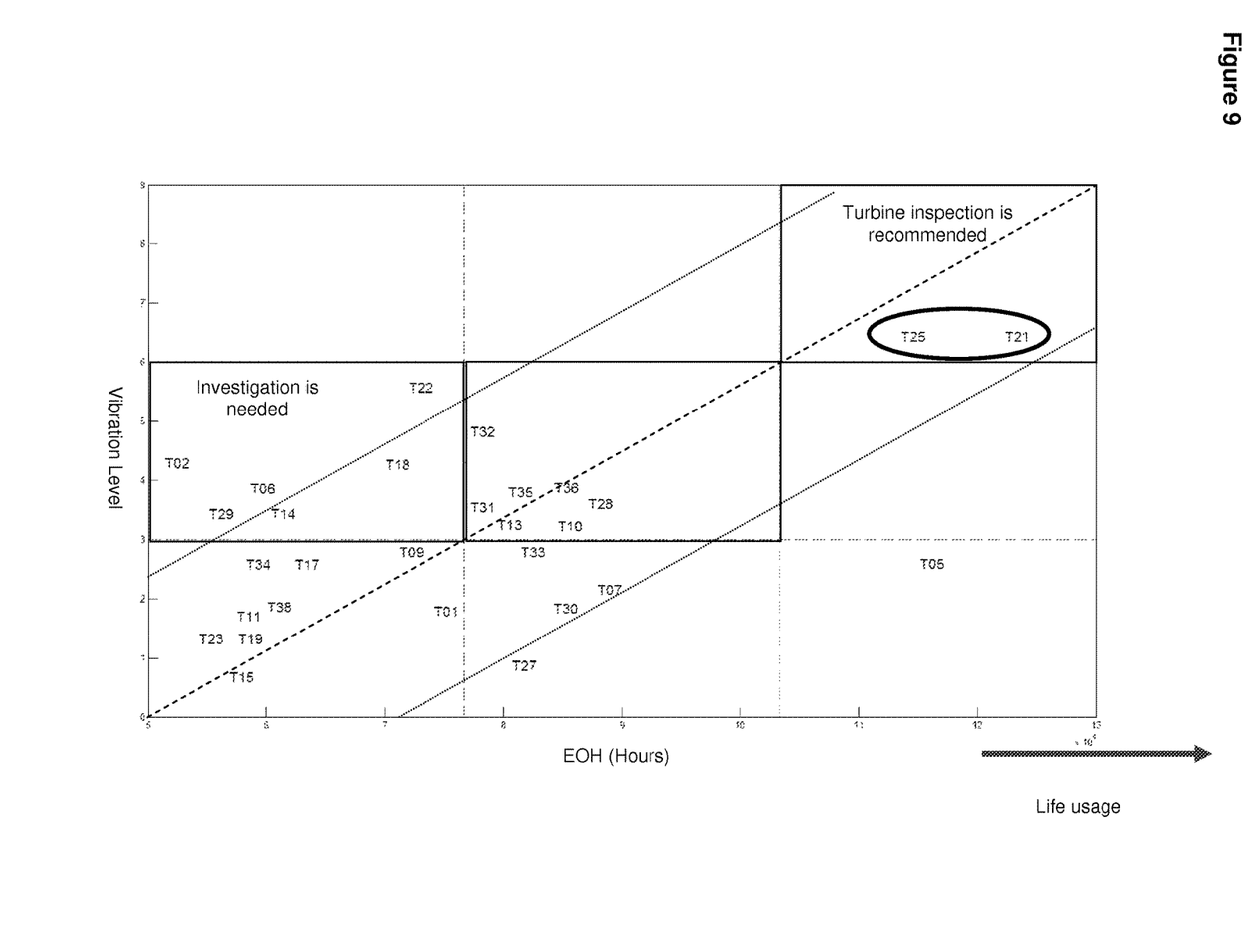
FIG. 9 shows a graph combining EOH operating life models with vibration data for a number of turbines operating in a wind farm.

FIG. 9 shows a graph combining EOH operating life models with vibration data for a number of turbines (T01 to T38) operating in a wind farm. Vibration levels in this context can be based on vibration signature analysis Turbines with moderate EOH and vibration typically require routine monitoring and planned inspections over a longer period.

Moderate levels of vibration when EOH values are low, for example turbine T02 in FIG. 9, may indicate that the wind or water turbine or component thereof should be investigated to see if one or more components are suffering damage and need to be repaired or replaced.

However, moderate levels of vibration at median values of EOH are probably normal, and should be merely monitored routinely. Moderate levels of vibration at high values of EOH require no action.

High levels of vibration at high EOH values may be indicative of a need for turbine inspection. Turbines with high EOH and high vibration (circled) can clearly be identified, and these require inspection.

Turbine T34 in FIG. 9 has a similar vibration level to turbine T05, but turbine T34 has a low EOH life. The former turbine is clearly operating better than other turbines of a similar EOH. Using a system for identifying turbines in need of maintenance based on thresholds alone would consider these two turbines to have the same status.

In addition to the approaches above, an additionally indicator of a requirement for maintenance may be obtained by collecting data relating to vibration of the wind or water turbine or component thereof on a test rig prior to installation. This can be taken as a subsequent baseline: increases in vibration after installation may be due to damage during transport or poor assembly.

Figure 10:
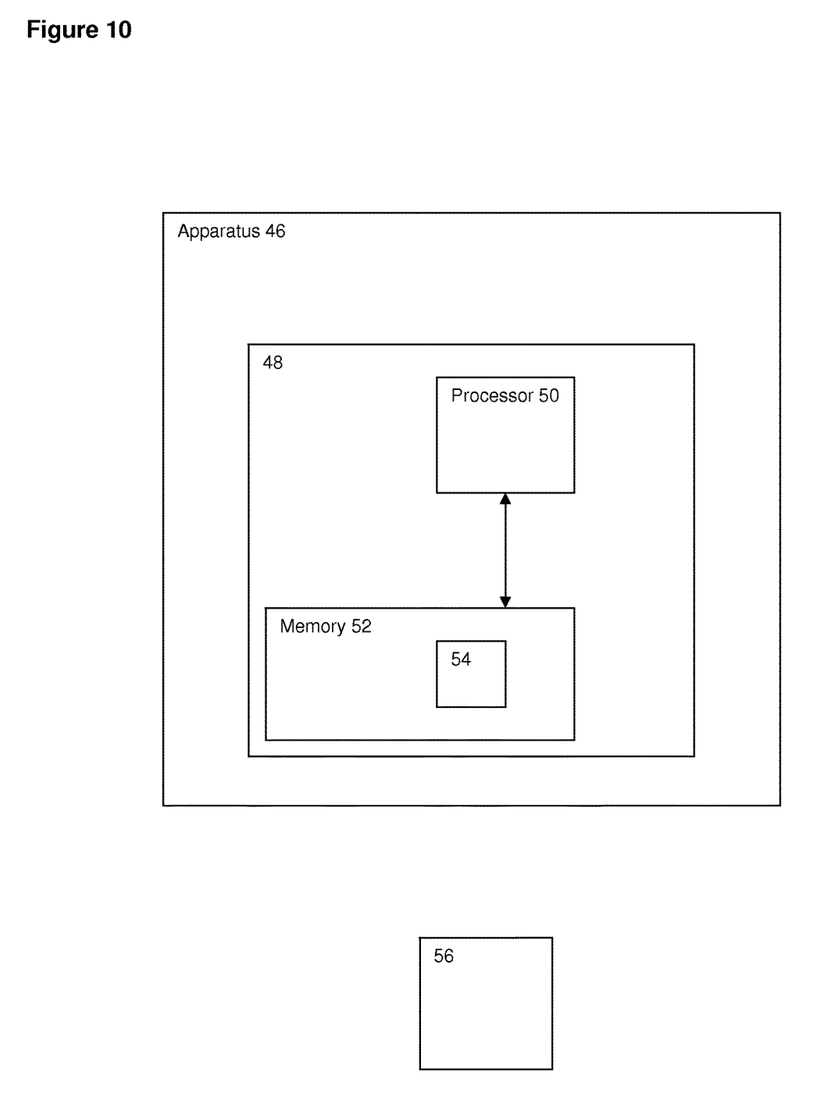
FIG. 10 illustrates a schematic diagram of an apparatus according to various embodiments of the invention.

FIG. 10 illustrates a schematic diagram of an apparatus 46 according to various embodiments of the present invention. The apparatus 46 includes means 48 for performing the steps illustrated in FIGS. 1 to 9. Means 48 includes a processor 50 and a memory 52. The processor 50 (e.g. a microprocessor) is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 46 when loaded into the processor 50. The computer program instructions 54 provide the logic and routines that enables the apparatus 46 to perform at least some of steps of the methods illustrated in FIGS. 1 to 9. The processor 50 by reading the memory 52 is able to load and execute the computer program 54.

The computer program may arrive at the apparatus 46 via any suitable delivery mechanism 56. The delivery mechanism 56 may be, for example, a computer-readable storage medium, a computer program product, a memory device, a record medium such as a Blue-ray disk, CD-ROM or DVD, an article of manufacture that tangibly embodies the computer program 54. The delivery mechanism may be a signal configured to reliably transfer the computer program 54. The apparatus 46 may propagate or transmit the computer program 54 as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The steps illustrated in the FIGS. 1 to 9 may represent steps in a method and/or sections of code in the computer program 54. The illustration of a particular order to the steps does not necessarily imply that there is a required or preferred order for the steps and the order and arrangement of the steps may be varied. Furthermore, it may be possible for some steps to be omitted.

The invention claimed is:

1. A method for predicting remaining useful life of a wind or water turbine or a component thereof, the method comprising the following steps performed by a computer system:
    in advance of operation of the wind or water turbine, calculating one or more EOH (Equivalent Operating Hours) coefficients from damage to the wind or water turbine or a component thereof under rated operating conditions derived from design data and under a plurality of historical field operating conditions of a same duration, and storing the calculated one or more EOH coefficients in a non-transitory computer-readable medium;
    determining an EOH for the wind or water turbine or component thereof according to the steps of:
    collecting data from one or more sensors placed in or on the wind or water turbine or component thereof, the one or more sensors monitoring one or more of the field operating conditions of the wind or water turbine or component thereof; and
    retrieving from the medium one or more of the EOH coefficients relating to each of the monitored one or more field operating conditions;
    determining the EOH as a function of the collected data relating to the monitored one or more field operating conditions and the one or more EOH coefficients relating to the monitored one or more field operating conditions;
    obtaining an EOH limit value for the wind or water turbine or component thereof; and
    comparing the determined EOH and the EOH limit to produce a value for the remaining useful life of the wind or water turbine or component thereof;
    wherein when the EOH is greater than the EOH limit, the method further comprises investigating for damage to the wind or water turbine or component thereof, the investigating including endoscope inspection of the wind or water turbine or component thereof.

2. The method according to claim 1, in which the step of assessing damage comprises providing one or more models selected from the group consisting of:
    a bearing skidding model;
    a dynamic model;
    a life model;
    a nominal model of a gearbox, drive-train and/or generator of the wind or water turbine;
    a model unique to a specific gearbox, drive-train and/or generator of the wind or water turbine including information on one or more manufacturing variations of one or more components of the gearbox, drive-train and/or generator;
    a fully coupled finite element model comprising nodes with six degrees of freedom unique to a gearbox, drive-train and/or generator of the wind or water turbine; and
    one or more meta-models, wherein the one or more meta-models are specific for each of the one or more components.

3. The method according to claim 1, in which each EOH coefficient is:
    a function of the damage under the rated operating conditions and damage under the field operating conditions of the same duration;
    a function of a ratio of the damage under the rated operating conditions to the damage under the field operating conditions of the same duration; or
    a ratio of the damage under the rated operating conditions to the damage under the field operating conditions of the same duration.

4. The method according to claim 1, in which the step of collecting data comprises one or more of the following:
    collecting historical data from the one or more sensors stored in the medium;
    collecting data relating to one or more steady state operating conditions;
    collecting data relating to one or more transient state operating conditions;

collecting data from the one or more sensors realtime during operation of the wind or water turbine or component thereof; and collecting data from a condition monitoring system connected to the wind or water turbine or component thereof.

5. The method according to claim 1, in which the step of retrieving one or more EOH coefficients comprises one or more of the following:

retrieving EOH coefficients relating to one or more steady state operating conditions; and retrieving EOH coefficients relating to one or more transient state operating conditions.

6. The method according to claim 1, wherein the method further comprises:

when the wind or water turbine or component thereof has damage:

refurbishing the wind or water turbine or component thereof; or having irreparable damage, replacing the wind or water turbine or component thereof.

7. The method according to claim 6, wherein the method further comprises:

when the wind or water turbine or component thereof is refurbished or replaced:

setting EOH of the wind or water turbine or component to zero.

8. The method according to claim 1, wherein the method further comprises:

when the wind or water turbine or a component thereof has failed, and when the EOH is less than the EOH limit:

investigating for damage to the wind or water turbine or component thereof, comprising endoscope inspection and:

refurbishing the wind or water turbine or component thereof: or having irreparable damage, replacing the wind or water turbine or component thereof.

9. The method according to claim 8, wherein the method further comprises:

when the wind or water turbine or component thereof is refurbished or replaced:

setting EOH of the wind or water turbine or component to zero.

10. The method according to claim 1, in which the determined EOH is compared to a preset EOH limit for further forensic investigation, the preset EOH limit for further forensic investigation being less than the EOH limit, wherein if the determined EOH is less than the preset EOH limit, then no action is taken and the wind or water turbine continues operation, and wherein if the determined EOH is higher than the preset EOH limit for further forensic investigation, further investigations of the turbine are undertaken, comprising the endoscope inspection.

11. The method according to claim 1, wherein the step of investigating further includes at least one of vibration analysis or oil analysis.

12. A method for identifying a wind or water turbine or a component thereof for maintenance, the method comprising the following steps of performed by a computer system:

determining an EOH (Equivalent Operating Hours) for the wind or water turbine or component thereof, comprising:

collecting data from one or more sensors placed in or on the wind or water turbine or component thereof, the one or more sensors monitoring one or more field operating conditions of the wind or water turbine or component thereof; and retrieving one or more EOH coefficients from a non-transitory computer-readable medium, relating to the one or more monitored field operating conditions and being calculated from damage to the wind or water turbine or a component thereof under rated operating conditions derived from design data and under a plurality of historical field operating conditions of a same duration;

determining the EOH as a function of the collected data relating to the monitored one or more field operating conditions and the one or more EOH coefficients relating to the monitored one or more field operating conditions;

setting thresholds for the collected data according to one or more ranges of EOH values;

comparing the collected data with at least one of the thresholds related to the determined EOH;

when the collected data is greater than the at least one threshold:

identifying the wind or water turbine or component thereof for maintenance; and investigating for damage to the wind or water turbine or component thereof by endoscope inspection, wherein if damage is indicated, performing one of the following additional steps of:

refurbishing the wind or water turbine or component thereof;

replacing the wind or water turbine or component thereof if the damage is irreparable; and down-rating the wind or water turbine or component thereof.

13. The method according to claim 12, in which the operating collected data is vibration data.

14. The method according to claim 12, wherein the wind or water turbine or component thereof continues operation if damage is not indicated.

15. The method according to claim 12, wherein the step of investigating further includes at least one of vibration analysis or oil analysis.

* * * * *